Nov. 6, 1934.  J. H. WAGENHORST  1,979,815
METHOD OF MAKING VEHICLE WHEELS
Filed March 4, 1931
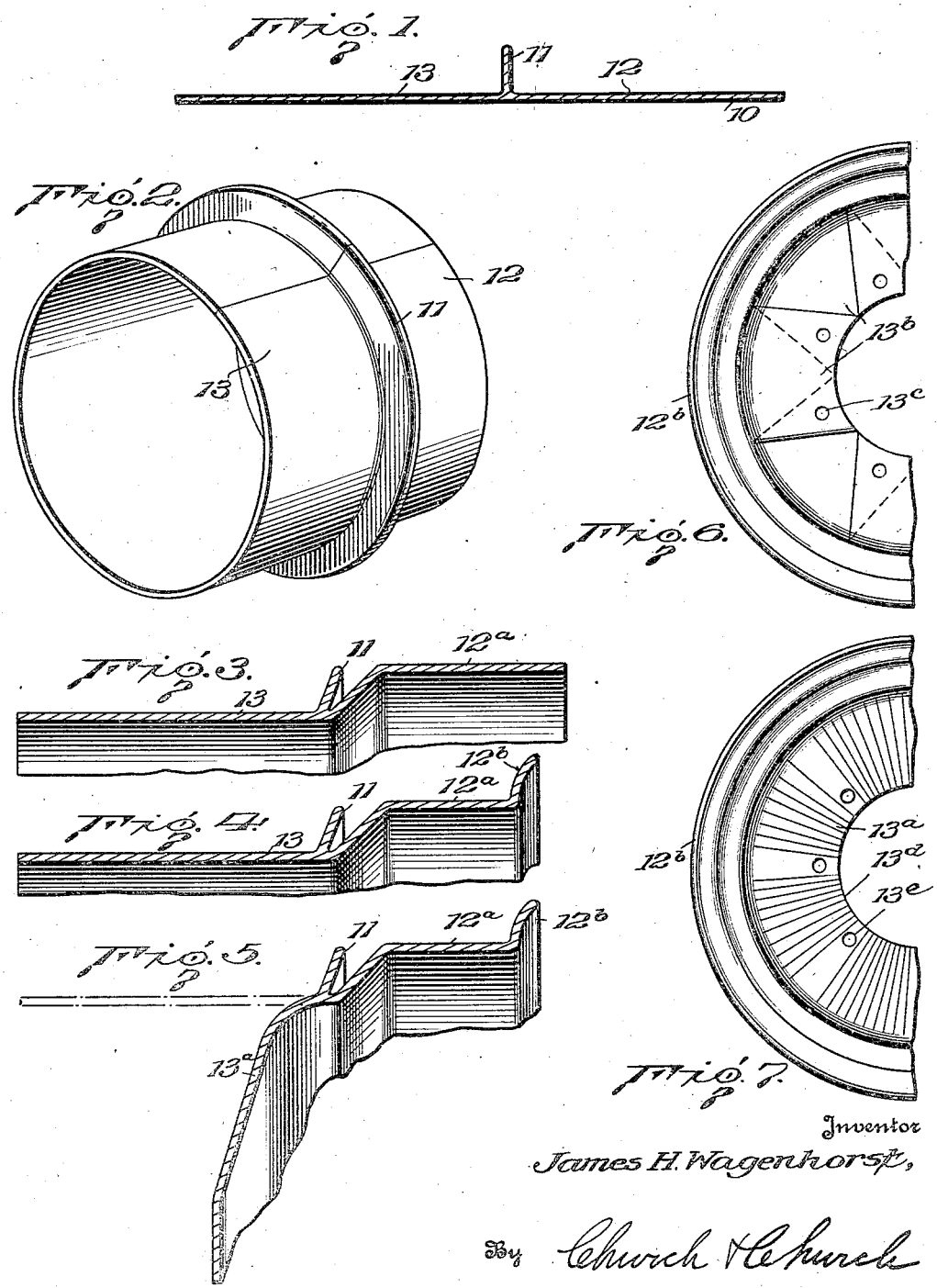
Inventor
James H. Wagenhorst,
By Church & Church
His Attorneys Patented Nov. 6, 1934

1,979,815

UNITED STATES PATENT OFFICE 1,979,815

METHOD OF MAKING VEHICLE WHEELS

James H. Wagenhorst, Detroit, Mich., assignor, by mesne assignments, to Kelsey-Hayes Wheel Company, Detroit, Mich., a corporation of Delaware Application March 4, 1931, Serial No. 520,140

8 Claims. (Cl. 29—159.01)

My invention relates to an improved method of making vehicle wheels, and has to do, more particularly, with the construction of automobile wheels of the type adapted to carry a pneumatic tire.

The general use of low pressure or balloon tires upon automobiles has resulted in a decrease in the diameter, and an increase in the width of the rim base of demountable rims, and such rims are stronger and more rigid than those formerly used. Coincident with the adoption of low pressure tires for general use, has been the adoption of four wheels brakes so that both front and rear wheel hubs have brake drums fastened thereto. This has resulted in a considerable increase in the unsprung weight of the automobile. Availing of the fact that all four wheels of the modern automobile have brake drums, there have been developed constructions of various forms, spoke and disc, in which the brake drum is employed as the central portion of the wheel proper by mounting the inner portions of the rim-supporting spokes or disc upon the brake drum instead of the hub. This has made possible a reduction of the unsprung weight and a reduction in the cost of manufacture, due to a saving in material. It is the principal object of my invention to further reduce the cost of manufacturing wheels of the brake drum-mounted type by providing a new and simpler method of forming such wheels. A further object of my invention is to reduce the cost of manufacture by forming the wheel and rim from a single rectangular blank without cutting away any material portion thereof to be discarded as "scrap."

Further objects and objects relating to details and economies of construction and operation will definitely appear from the detailed description to follow. In one instance, I accomplish the objects of my invention by the devices and steps set forth in the following specification. My invention is clearly defined and pointed out in the appended claims. A method constituting a preferred embodiment of my invention is diagrammatically illustrated, step by step, in the accompanying drawing forming a part of this specification, in which:

Figure 1 is a transverse sectional view of the simple rectangular blank from which the wheel and rim member is formed;

Fig. 2 is a view, in perspective, of the blank curled and welded into cylindrical form;

Fig. 3 is a sectional view through a portion of the cylinder after the rim base and gutter for the detachable tire-retaining flange have been formed therein;

Fig. 4 is a similar view showing the integral tire-retaining flange formed upon the rim base.

Fig. 5 is a fragmentary sectional view through a portion of the finished wheels, the detachable tire-retaining flange being omitted.

Fig. 6 is a face view of the inside in side elevation of one form of wheel made in accordance with my invention, in which the excess metal provided by bending a portion of the cylindrical blank inwardly to form the wheel disc is accommodated and utilized by providing that portion of the cylinder with spaced cuts and lapping the segments during the bending operation; and Fig. 7 is a face view of the inside of a modified form of wheel in which the excess metal is accommodated by corrugating the disc-forming portion during the bending operation.

In the drawing the same reference numerals refer to the same parts throughout the several views.

Referring to the numbered parts of the drawing, my method consists in cutting a rectangular metal sheet 10 of the required size and thickness, in which is formed the integral rib 11, preferably by hot rolling. The rib 11 divides the sheet into two integral sections, a rim-forming section 12 and a disc-forming section 13. The blank is then curled into cylindrical form and the abutting ends are joined by welding as shown in Fig. 2. The rim-forming portion of the cylinder is then expanded radially to form a rim base 12a having a diameter substantially the same as that of the rib 11 as shown in Fig. 3. The rib 11 is preferably inclined toward the rim base 12a to provide therebetween a channel of V shape for the reception of a conventional detachable tire-retaining flange (not shown). An integral tire-retaining flange 12b is formed upon the other edge of the rim base as shown in Fig. 4 by suitable flanging rolls. The portion 13 of the cylinder is then bent radially inwardly to form the disc or rim-supporting portion 13a of the wheel as shown in Fig. 5. However, due to the pressing of the cylindrical portion into a much smaller compass, a large amount of excess metal must be accommodated. It is an important feature of this method that such metal is preferably not cut out and removed, but is utilized to strengthen the wheel at its zone of greatest stress, the hub engaging portion. In the embodiment illustrated in Fig. 6, the disc-forming portion 13 of the cylindrical blank is provided with a series of longitudinal cuts, thus dividing that portion into a plurality of sections 13b, which, when bent radially inwardly to constitute the rim-supporting portion 13a, are lapped over each other to accommodate the excess metal. These overlapped portions are perforated at 13c and are secured by bolts to the brake drum (not shown). If desired, other fastening means may be employed.

In the modification shown in Fig. 7, the excess metal is accommodated and utilized for strengthening by forming corrugated zones 13d in the portion 13 of the cylinder as it is being pressed radially inwardly to provide the rim supporting disc 13a. Apertures 13e for receiving the securing bolts are provided, preferably intermediate the corrugated zones of the disc.

Should it be deemed desirable or expedient, apertures may be provided in the rim-supporting disc 13a adjacent its periphery, for reducing weight and inducing currents of air cooling the rim and the tire mounted thereupon.

It will be observed that I have provided an extremely simple method of making a vehicle wheel and rim by which stronger wheels can be made from a single rectangular blank, with a minimum of material, without any substantial loss in the form of scrap, and by simple operations requiring much less manual labor and attention than heretofore.

I am aware that the method herein disclosed may be changed considerably without departing from the spirit of my invention. I, therefore, claim my invention broadly, as indicated by the appended claims.

What I claim is:

1. The method of making a vehicle wheel having an integral tire-supporting rim which comprises forming a rectangular metal sheet with an integral rib, curling said sheet into the form of a circularly ribbed cylinder and welding the seam, pressing the metal adjacent one end of the cylinder radially outwardly to constitute a tire-retaining flange, retaining the portion intermediate the rib and flange in cylindrical form to constitute the rim base, and bending the portion on the other side of the rib inwardly to form the rim-supporting portion of the wheel.

2. The method of making a vehicle wheel having an integral tire-supporting rim which comprises forming a rectangular metal sheet with an integral rib, curling said sheet into the form of a circularly ribbed cylinder and welding the seam, pressing the metal on one side of the rib radially outwardly to constitute with said rib a channel for reception of a detachable tire-retaining flange, a rim base, and an integral tire-retaining flange, and bending the metal on the other side of the rib inwardly to form the rim supporting portion of the wheel.

3. The method of making a vehicle wheel having an integral tire-supporting rim which comprises forming a rectangular metal sheet with an integral rib, curling said sheet into the form of a circularly ribbed cylinder and welding the seam, pressing the metal on one side of the rib radially outwardly to constitute with said rib a channel for reception of a detachable tire-retaining flange, a rim base, and an integral tire-retaining flange, and bending the metal on the other side of the rib inwardly at the same time forming corrugations therein to relieve the excess metal provided by the bending step.

4. The method of making a vehicle wheel having an integral tire-supporting rim which comprises forming a rectangular metal sheet with an integral rib, curling said sheet into the form of a circularly ribbed cylinder and welding the seam, pressing the metal on one side of the rib radially outwardly to constitute, with said rib, a channel for reception of a detachable tire-retaining flange, a rim base and an integral tire-retaining flange, making a plurality of evenly spaced longitudinal cuts in the cylinder portion on the other side of the rib, and bending the thus-formed tongues inwardly, lapping their cut edges over one another to relieve the excess metal.

5. The method of making wheels comprising the forming of a rectangular strip provided with a central longitudinal rib, forming said strip into a cylinder and uniting the abutting ends, expanding the portion of said cylinder at one side of said rib to form with said rib a gutter and a rim base, forming an integral tire-retaining flange on one edge of said rim base, and pressing the portion of said cylinder on the opposite side of said rib into substantial perpendicularity to the rim base to form an integral wheel body, at the same time so forming such portion as to strengthen it and take care of excess metal developed by the pressing operation.

6. The method of making a vehicle wheel having an integral tire supporting rim, which comprises forming a metal sheet into a cylinder, uniting the abutting ends, fashioning a portion of the cylinder into an annular gutter adapted to receive a detachable flange and into an annular rim base of greater diameter than said gutter and connecting thereinto, and bending another portion of the cylinder inwardly to form the rim supporting portion of the wheel.

7. The method of making a vehicle wheel having an integral tire supporting rim, which comprises forming a metal sheet with an integral rib into a circularly ribbed cylinder, uniting the abutting ends, pressing the metal on one side of the rib radially outwardly to constitute with said rib a channel for receiving a detachable tire retaining flange and an integral rim base, and bending the metal on the other side of the rib inwardly to form the rim supporting portion of the wheel.

8. The method of making a vehicle wheel having an integral tire supporting rim, which comprises shaping a metal sheet having a rib into the form of a cylinder having an annular rib, pressing the material occupying different zones adjacent one end of the cylinder radially outwardly to form with the rib an annular gutter, to form an annular rim base, and to form an annular tire retaining flange, and bending the remaining portion connecting into the annular gutter inwardly to form the rim supporting portion of the wheel.

JAMES H. WAGENHORST.